United States Patent [19]
Williams

[11] 3,818,898
[45] June 25, 1974

[54] ECHO-ENCEPHALOGRAPHIC APPARATUS

[75] Inventor: James Bryan Williams, Lexington, Mass.

[73] Assignee: Diagnostics Electronics Corporation, Lexington, Mass.

[22] Filed: June 7, 1972

[21] Appl. No.: 260,496

Related U.S. Application Data

[63] Continuation-in-part of Ser. No. 19,815, March 16, 1970, abandoned.

[52] U.S. Cl. ............................... 128/2 V, 73/67.8
[51] Int. Cl............................................ A61b 10/00
[58] Field of Search............. 128/2 V, 2.05 Z, 24 A; 73/67.5–67.9

[56] References Cited
UNITED STATES PATENTS

| | | | |
|---|---|---|---|
| 3,292,018 | 12/1966 | Clynes | 73/67.8 X |
| 3,323,512 | 6/1967 | Clynes | 128/2 V |
| 3,334,622 | 8/1967 | Brech | 128/2 V |
| 3,372,576 | 3/1968 | Dory | 73/67.9 |
| 3,554,186 | 1/1971 | Leksell et al. | 128/2 V |
| 3,565,057 | 2/1971 | Hart | 128/2.05 |
| 3,681,977 | 8/1972 | Wendt et al. | 128/2 V |
| 3,713,329 | 1/1973 | Munger | 128/2 V X |

OTHER PUBLICATIONS

Fry, W. J. et al., Journ. of Acoustical Soc. Of Amer., Vol. 44, No. 5, 1968, pp. 1,324–1,338.
Robinson, D. E. et al., Ultrasonics, April–June, 1965, pp. 69–74.
Ultrasonic Diagnosis of Surgical Disease, Sept. 1961, 12 pages.
Makow, D. M. et al., Journ. of Acoustical Soc. of Amer., Vol. 44, No. 5, 1968, pp. 1,346–1,352.

*Primary Examiner*—Kyle L. Howell

[57] ABSTRACT

Echo-encephalographic apparatus for location of the centerline of the brain relatively to the centerline of the head including a sonic pulse transducer adapted to be applied to one side of the head and a sonic pulse generator connected thereto for providing a sonic pulse for producing echoes from the opposite side of the head and from the centerline of the brain. A computer is connected to the transducer for automatically computing the displacement of the centerline of the brain relatively to the centerline of the head. The computer includes head dimesion measuring means including head dimension gate means for masking preliminary echoes, head dimension centerline calculating means for calculating the centerline of the head dimension, brain centerline measuring means connected to the head dimension measuring means and responsive to a successful head measurement. The brain centerline measuring means includes brain centerline gate means connected to the head dimension centerline calculating means and responsive to echoes within a predetermined displacement of the centerline of said dimension of the head and displacement calculating means connected to the head dimension and brain centerline measuring means providing a displacement signal and including display means for displaying the displacement. The head dimension measuring means includes head measurement signal means for signalling a successful measurement of the head and the brain centerline measuring means includes brain centerline signal means for signalling a successful measurement of the distance to the centerline of the brain.

10 Claims, 12 Drawing Figures

ECHO-ENCEPHALOGRAPHIC APPARATUS

This application is a continuation-in-part of my application Ser. No. 19,815, filed Mar. 16, 1970, now abandoned. Its invention relates to encephalography and more particularly to the location of the centerline of the brain.

One of the primary applications of encephalography is to the detection of increased intra-cranial pressure. If the cause is a unilateral space occupying abnormality (such as bleeding or swelling due to trauma, tumor growth, etc.), the brain may be displaced away from one side of the head. Thus, under compression, the interfaces of brain tissue will exhibit a shift from normal positions.

In echo-encephalography, a pulse of ultrasound is transmitted into the head. Some of the initial energy of the pulse is reflected from every interface through which the sound travels. The transit time of the echo pulse provides a measure of the distance of the echoing surface from the transmitter. Some of the largest echoes from brain surfaces arise from fissures and other structures in the mid-line region. This property, coupled with the fact that, normally, these structures lie in a vertical plane a few millimeters wide centered in the middle of the head, make their position a sensitive parameter for the indirect deduction of intra-cranial pressure.

The echo-encephalographic determination of midstructure location may be made in a variety of ways, conventional instrumentation for analyzing these echoes consisting of one or more piezo-electric crystals, a pulse shaping network, and an oscilloscope with attached camera, in which the crystals can serve both as transmitters of the initial pulse and as receivers of echoes or in different combinations of these functions. All of the techniques involve a direct or inherent measurement of the overall size of the head along the path of the ultrasonic pulse. This distance is effectively halved to locate the true midline of the head. The echoes are sought and examined which arise from the midstructures of the brain. A shift of more than a few millimeters of these structures from the true head midline is diagnostically informative. For example, if access is available to both sides of the head, two detectors may be positioned on the sides of the head along a line facing each other. The one-way transit time through the head from one detector to the other provides the reference "zero" which should be the round trip time for a pulse echoing from midbrain structures lying exactly on the midhead line. Alternatively, each detector consecutively may transmit its own pulse and receive echoes from it. These may be displayed simultaneously for comparative analysis. If access to only one side of the head is available, a single transducer is used to transmit a pulse and to receive echoes. The display of all echoes permits visual inspection, identification and measurement.

In practice, an operator has heretofore had to observe, identify and record the echo pattern, which requires much skill and practice, but nevertheless frequently produces inconsistent results due to the large number of available oscilloscope and other adjustments, as well as to the criticality of the correct positioning of the probe against the patient's head.

Accordingly, it is a major object of the present invention to provide novel encephalographic apparatus which solves the majority of the above mentioned problems, to the extent that relatively unskilled operators are able to produce consistent and accurate determinations of brain centerline displacement.

Briefly, the present invention accomplishes these results by measuring means, which utilize sonic pulses, together with computing means adapted to recognize the desired echo pattern and automatically compute the displacement of the centerline of the brain for suitable display. It has been referred to in Neurology, Vol. 21, February 1971 at pp. 140–153 and J. Neurosurgery, Vol. 35, October 1971 at pp. 453–459.

For the purpose of more fully explaining further objects and features of the invention, reference is now made to the following detailed description of preferred embodiments of the apparatus of the invention, together with the accompanying drawings, wherein.

Figure 1:
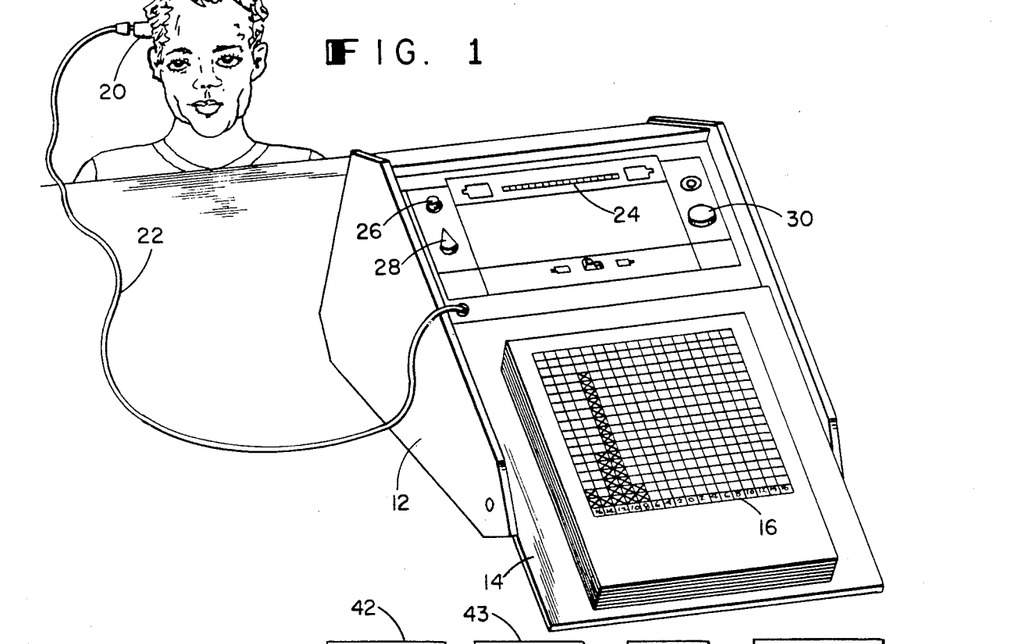
FIG. 1 is an overall view of the apparatus of the invention, showing its transducer probe applied to the head of a patient.

Referring to the drawings, in FIG. 1 is shown the echo-encephalographic apparatus in use. In general, it includes an enclosing housing 12 having a hinged cover 14 for supporting an operator's chart 16. A transducer probe 20 is connected by a wire 22 to housing 12. Indicators are provided on housing 12 in the form of a brain centerline display 24 and overload indicator 26 and control 28. A start button 30 is also provided to initiate operation of the apparatus.

Figure 2:
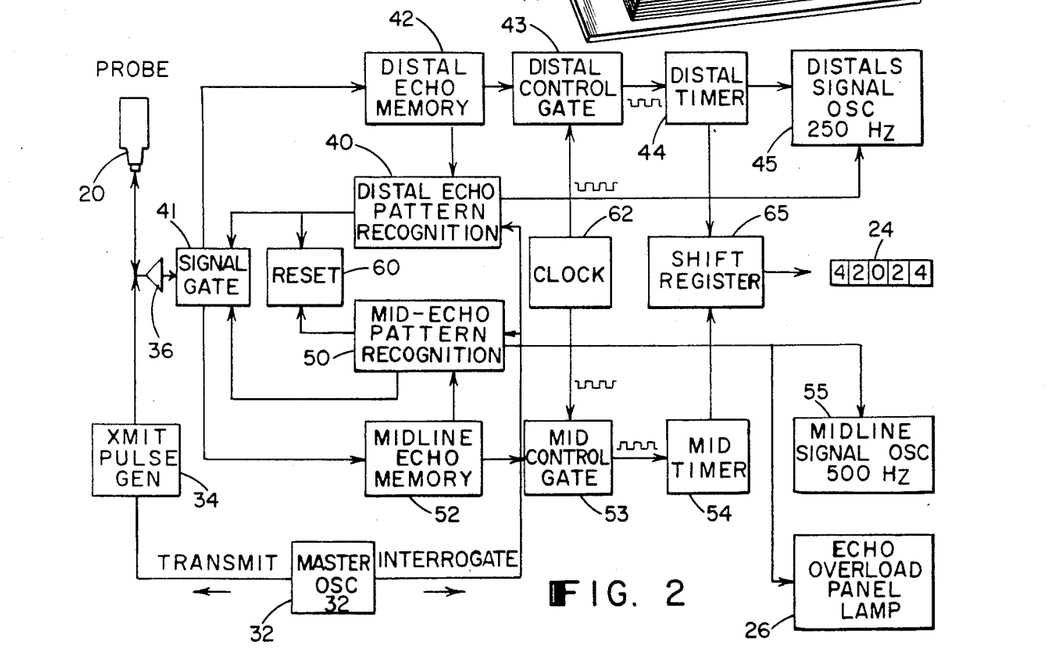
FIG. 2 is a block diagram of the apparatus of FIG. 1.
Figure 6:
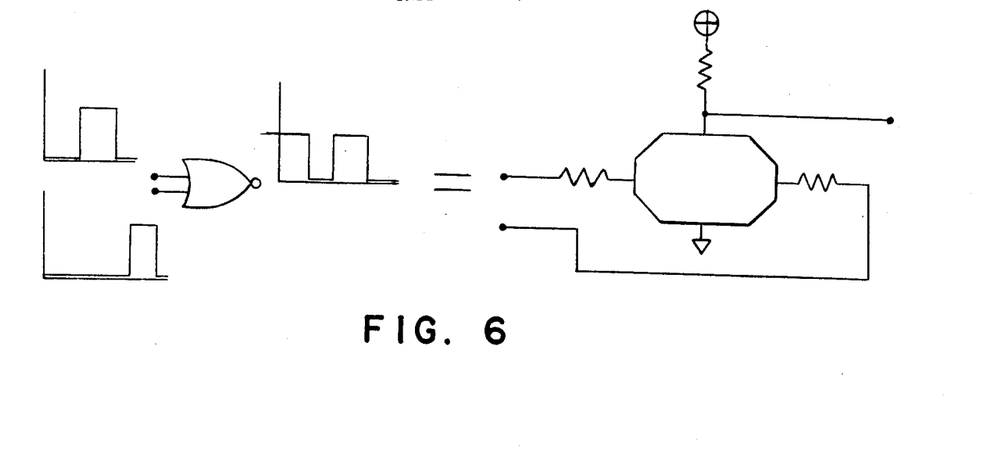
FIG. 6 illustrates a NOR gate and its circuit.
Figure 7:
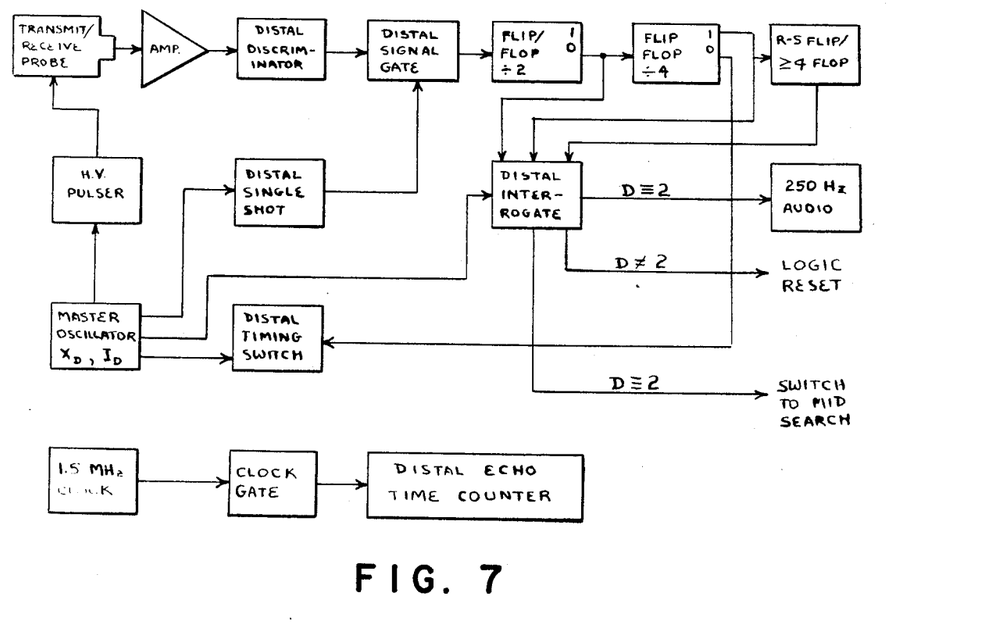
FIG. 7 is a more detailed block diagram of the apparatus of FIG. 1.
Figure 8:
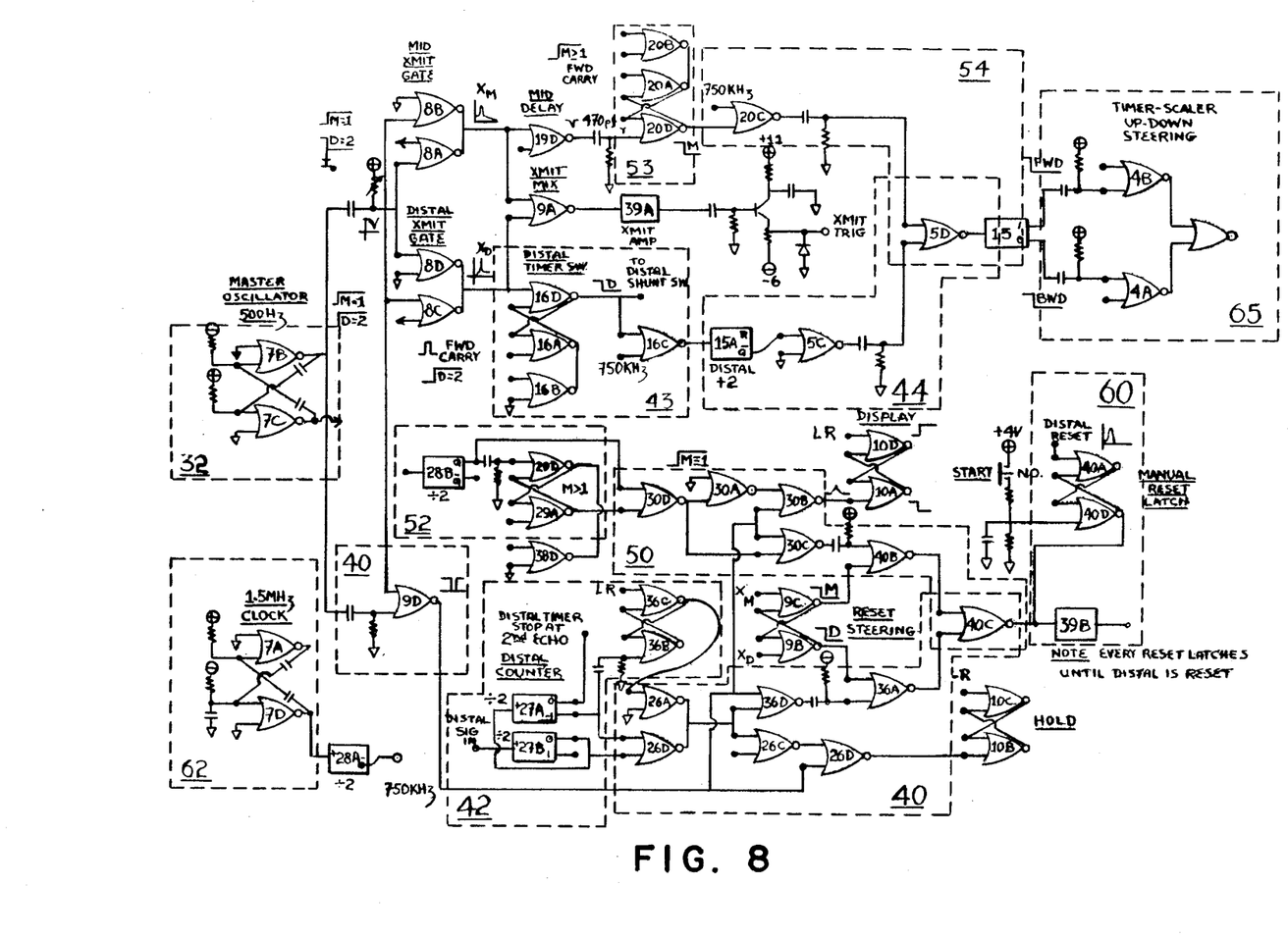
FIG. 8 is a logic circuit diagram of the apparatus of FIG. 1.

In FIGS. 2 and 7 is shown the apparatus of the invention in block diagram form, the specific circuitry of the block elements being well known to those skilled in the art and being reproduced herein in FIGS. 6, 8, 9, 11 and 12. As shown in FIG. 2, however, such apparatus for the location of the centerline of the brain relatively to the centerline of a head dimension has a master oscillator 32 connected to a sonic transmitting pulse generator 34 which is connected to transducer probe 20 adapted to be applied to one side of a patient's head as shown in FIG. 1 for providing a sonic pulse for producing distal echoes from the opposite side of the patient's head and midline echoes from the centerline of the brain. With a single transducer probe, probe 20 is also connected to the input of the computer as is master oscillator 32 for automatically computing the displacement of the centerline of the brain relatively to the centerline of said head dimension. The computer, in effect, performs three major functions: the head dimension (distal) measuring function; the brain centerline (midline) measuring function and the displacement calculating function. The computer elements which perform the head dimension measuring function include distal echo pattern recognition circuit 40 connected to master oscillator 32 and to transducer probe 20 through amplifier 36, signal gate 41 and distal echo memory 42. The output of the latter sets distal control gate 43, through which pulses from clock 62 pass to distal timer 44 and shift register 65. It also, through distal pattern recognition circuit 40, sets signal gate 41 to initiate operation of the brain centerline (midline) measuring portion. Distal pattern recognition circuit 40 includes an audio (250 Hz) head measurement signal oscillator 45 for signalling a successful head measurement in a form easily recognizable by the operator. The computer elements which perform the brain centerline measuring function similarly include midline echo pattern recognition circuit 50 connected to master oscillator 32 and to transducer probe 20 through amplifier 36, signal gate 41, after being set by distal pattern recognition circuit 40, and midline echo memory 52. The output of the latter sets midline control gate 53 through which pulses from clock 62 pass to midline timer 54 and shift register 65. Midline pattern recognition circuit 50 also includes an audio (500 Hz) brain centerline signal oscillator 55 for signalling a successful brain centerline measurement in a form easily recognizable by the operator and also echo overload panel lamp 26. A circuit reset 60 is connected to pattern recognition circuits 40 and 50. The computer elements which perform the displacement calculating function include, connected to timers 44 and 54, shift register 65, which drives display 24 for indicating the amount of displacement.

Figure 3:
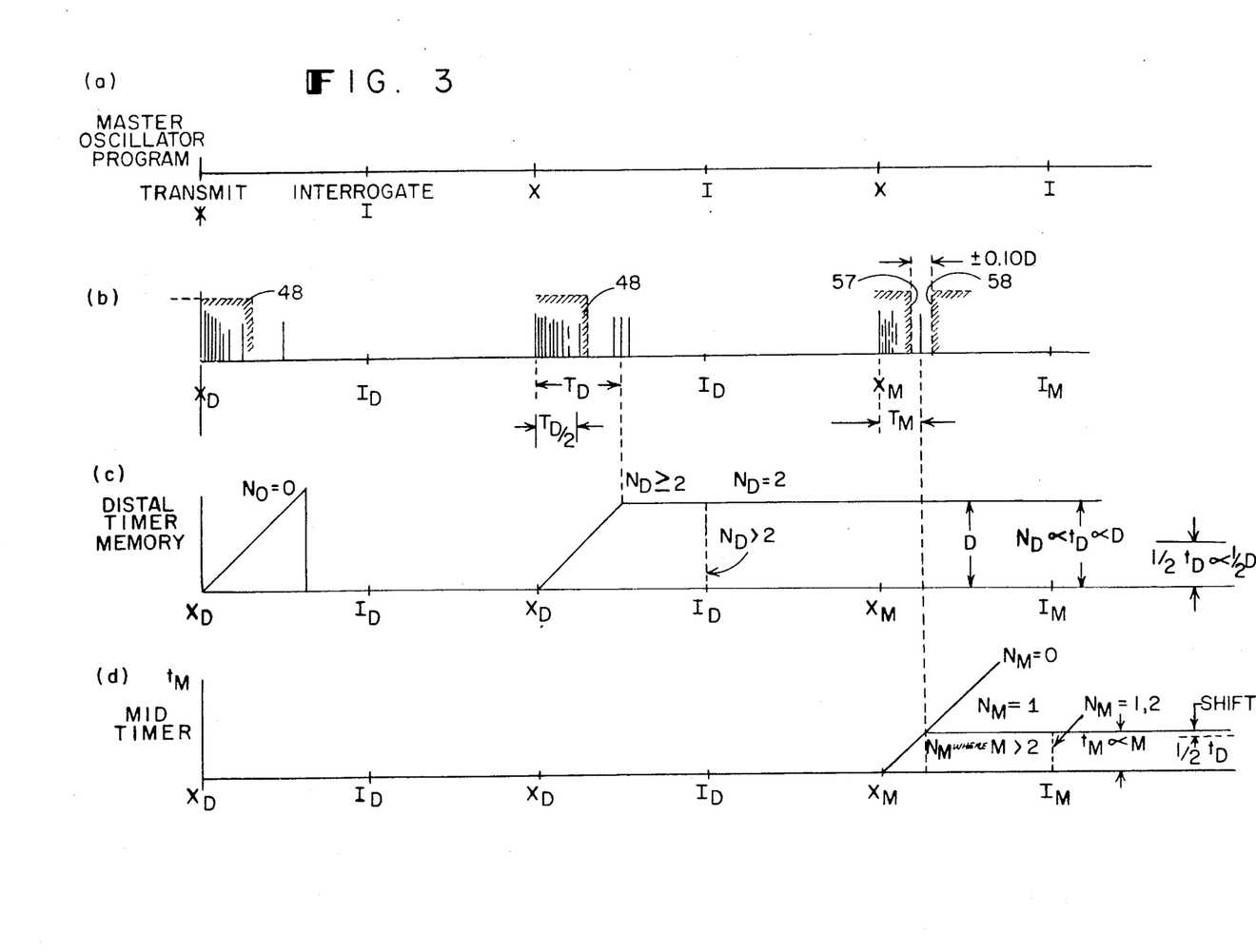
FIG. 3 is a timing and counting diagram of the apparatus of FIG. 1.
Figure 4:
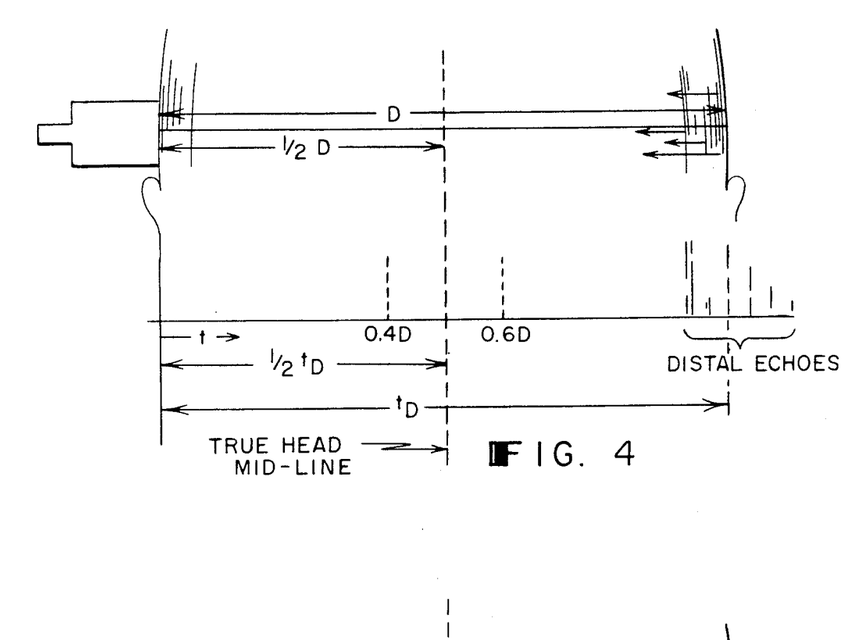
FIG. 4 is a diagrammatic view showing the application of a single transducing probe applied to the head of a patient.

Referring now to FIGS. 3 and 4 as well as to FIG. 2, the basic control of the computer logic is accomplished by master oscillator 32, which programs alternate transmit (X) and interrogation (I) cycles at 1 millisecond intervals (see FIG. 3a). The complete search program is as follows:

STEP I

The master oscillator generates a transmit pulse ($X_D$) to initiate the search for echoes from the far (distal) side of the head. If only one side of the head is accessible, the same transducer 20 is used to transmit and receive, as is preferred.

Preliminary echoes begin to return to the crystal from the detector-skin, scalp-skull, skull-brain and many other near interfaces, see FIG. 4. Because of the high energy of these reverberation echo pulse trains, they appear as a continuous series immediately following the transmit pulse. (See FIG. 3b.) In order to avoid confusing these echoes with those from the far side of the head, signal gate 41 is kept closed for a predetermined time as indicated by lines 48 (FIG. 3b), preventing pulses within that time from entering the distal echo pattern recognition circuit 40.

The master oscillator also gates the clock pulses $N_D$ into the distal timer 44, which marks time to the returning echoes. This may be either analog (i.e., a voltage ramp) or digital (i.e., oscillator-counter circuitry). (FIG. 3c.)

There are usually two predominant echoes from the distal side of the head (from interfaces such as brain-skull and scalp-air). The last "true" echo to be received during the search should be from the scalp-air interface. However, not infrequently, there are many reverberations or echoes internally reflected between the skull-scalp-air structures. Since there may be one or many of these reverberations returning some energy to the crystal detector, there may be one or more echoes received after the echo from the skin-air interface, which is the true measure of the overall head size. (See FIG. 4.)

Therefore, the computer counts the received echo signal pulses and gates off the clock pules to the distal timer 44 upon the receipt of the second one of all the returning pulses. (Distances = D in FIG. 3c.) The number of clock pulses $N_D$ are directly related to the distance D.

STEP II

The master oscillator interrogates the distal echo memory 42. If the number of echoes received is not exactly two, the interrogate pulse resets all circuits to be ready to start a new distal search 1 msec later. If exactly two counts have been received, the interrogate pulse:

a. closes the signal input to the distal counter by means of signal gate 41;
b. opens the signal input to the midcounter by signal gate 41;
c. triggers a 250 Hz audio tone from oscillator 45, for indicating to the operator a successful distal search.

The distal counter automatically divides in half its stored value, $T_D$, (which is directly related to the total head size D) and sets the signal gate 41 to open only for a time period during the following mid search, starting 20 percent before the true midline of the head and ending 20 percent later, as indicated by lines 57, 58, respectively. (FIG. 3b.)

STEP III

A mid echo search is initiated by the transmit pulse following the interrogation ($I_D$) of a successful distal search resulting in the switching of signal gate 41. As with the distal search, clock 62 times ($T_M$) the mid echoes ($N_M$). Because of the mid structure shapes, the characteristic echo from midline areas sometimes appears as a double pulse. The input counting circuitry will accept either a single or a close-lying double echo, stopping the clock at the first (FIG. 3c).

STEP IV

The master oscillator 32 interrogates the midline echo memory 52 ($I_M$). If zero, three or more pulses are received during the open gate period, then again all of the memory and control circuits are reset and the subsequent transmit pulse initiates a new distal search. This insures that the instantaneously correct head diameter will be used to reference the mid echoes since there can be no re-orientation of the transducer 20 during the 2 millisecond period following a successful total head size measurement. If 3 or more echoes are recorded, an intermittent flashing red front panel lamp 26 (REDUCE POWER) informs the operator that the failure of that search cycle was due to the receipt of too many echoes, rather than none at all. If the correct mid echo pattern was received, the mid interrogation pulse:

a. blocks all further transmission and logic;

b. triggers a 500 Hz audio tone;
c. lights panel shift digit lamp in display 24.

This display state obtains indefinitely until the operator has an opportunity to record the display on his chart 16 (FIG. 1), after which he manually resets the complete unit by means of pushbutton switch 30 which erases all memories and restarts the distal search. The difference between the time for the mid structure echo return ($T_M$) and one-half the transit time for the head size ($1/2\ T_D$), is computed automatically and indicated as millimeters of "shift" of the mid echo from "0" (the location of the true centerline of the head) as appears in displacement indicator 24 and is recorded on chart 16.

Referring now more specifically to FIGS. 6 through 12 showing the circuitry in more detail, to explain the design and operation of the apparatus of the invention more fully, it is important to identify the basic logic functions which are used. FIG. 6 shows a conventional NOR gate and its actual internal circuit. These basic gates may be paralleled to permit more inputs and may be cross-coupled with and without capacitors and resistors to form all classes of multivibrators:

Set/Reset Flip-Flops
Single-Shot variable pulse length pulse generators
Free-Running oscillators.

In addition, some single-purpose integrated circuits such as "divide by two" flip-flops are used as well as current drivers and differential comparators.

To illustrate the use of this logic, first consider the circuits used for determining the head size (distal search). FIG. 2 shows these as blocks 40, 41, 42 and 43. This figure can be differentiated further into the block diagram of FIG. 7. The flow of logic begins with the master oscillator which alternately initiates transmit and interrogate pulses every one millisecond. Until the successful measurement of the head size, all transmit pulses ($X_D$) trigger distal echo searches. The received echoes must satisfy three criteria to be accepted as the basis for head size determinations:

1. The echo amplitudes must exceed the distal discrimination levels.
2. The times of arrival of the echoes must be after the distal signal gate has opened.
3. The number of echoes must be exactly two.

The number of echoes is recorded in the distal echo memory (42, FIG. 2; Flip-Flops $\div 2$, $\div 4$ and $\geq 4$ in FIG. 7; and 27A, 27B, 36B and 36C in the logic diagram, FIG. 8). These counting stages are interrogated by the master oscillator (through 40, FIG. 2; distal interrogate, FIG. 7, and 9D, 26A, 26B, 26C, 26D, 36A, 36D and 40C in the logic diagram, FIG. 8).

Figure 9:
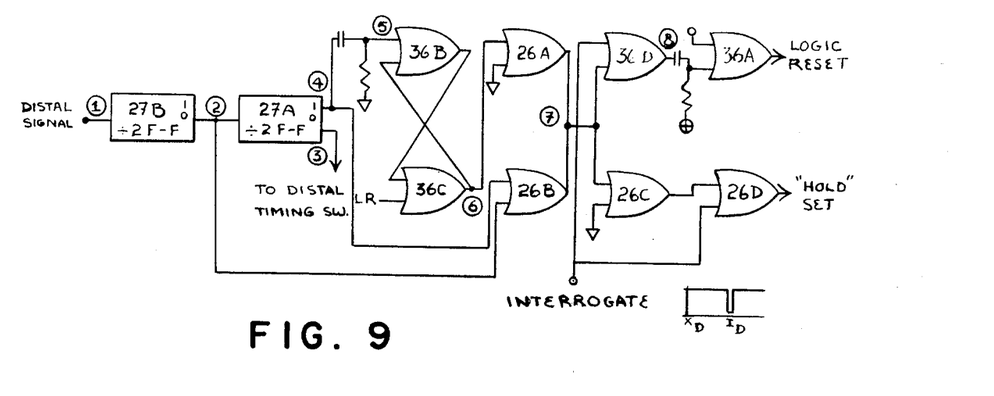
FIG. 9 is a portion of the logic circuit diagram of FIG. 8.
Figure 10:
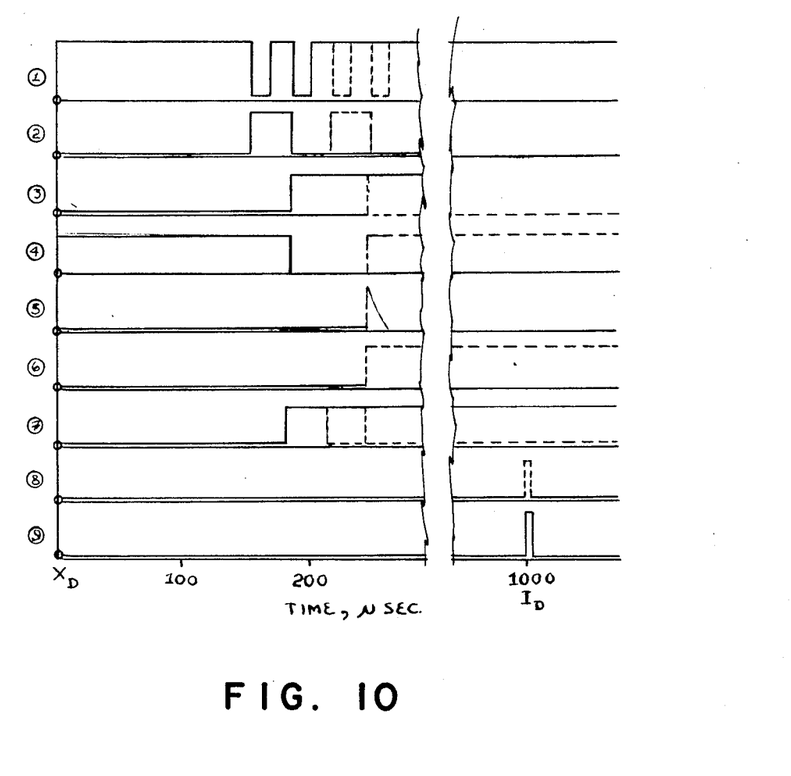
FIG. 10 is an illustration of a typical echo counting and interrogation sequence of the logic circuit of FIG. 9.

The pertinent logic circuits are shown again in FIG. 9 with a typical echo counting and interrogation sequence shown in FIG. 10. The waveforms are shown for different points in the circuit. The solid lines indicate an acceptable echo pattern (i.e., two echoes only) while the dashed line shows the effect of an additional two echoes. Note that at the receipt of the second echo, a signal at point (3) is sent to the distal timing switch (44 in FIG. 2) which stops the clock. If additional counts are subsequently received they are recorded (at the fourth count a Set-Reset flip-flop [R/S $\geq$ 4 in FIG. 7; 36B, 36C in FIG. 9] is set).

Recall that NOR gates (FIG. 6) require that all inputs be low in order to get a high output. Thus, the conditions for a high output at point (7) in FIG. 9 are lows on points (2), (4) and (6). The numbers of echoes required to achieve this are summarized in the following sets:

| Points | No. of Echoes for Low |
|---|---|
| 2 | [0, 2, 4, 6, . . . .] |
| 4 | [2, 4, 6, . . . .] |
| 6 | [1, 2, 3] |

The only common element in all the sets (i.e., the number of echoes which creates a high at (7) is 2. In that case one input to Gate 36D is high upon the arrival of the interrogation pulse at the other input. This blocks the logic reset. The high at (7) simultaneously appears as a low at (8) after being inverted by 26C. This passes the hold set pulse out of 26D when the interrogation pulse arrives. The hold R/S flip-flop (10B, 10C in FIG. 8) sets up the logic sequence of the mid-echo search which is then initiated by the next transmission pulse.

Another example of the logic is in the unique design of the mid gate (block 41 in FIG. 2). After the determination of head size (distal search) by the storage of a number of clock pulses, the location of mid echoes is determined in a similar manner. Echoes whose amplitudes exceed the mid discriminator are counted only if they are received while the mid gate is open. This echo counting period is adjusted to correspond to a space in the mid-brain which is centered on the half-way point in the head as determined by the distal determination. The gate is opened for a time equal to 20 percent of the distal head size time.

Figure 11:
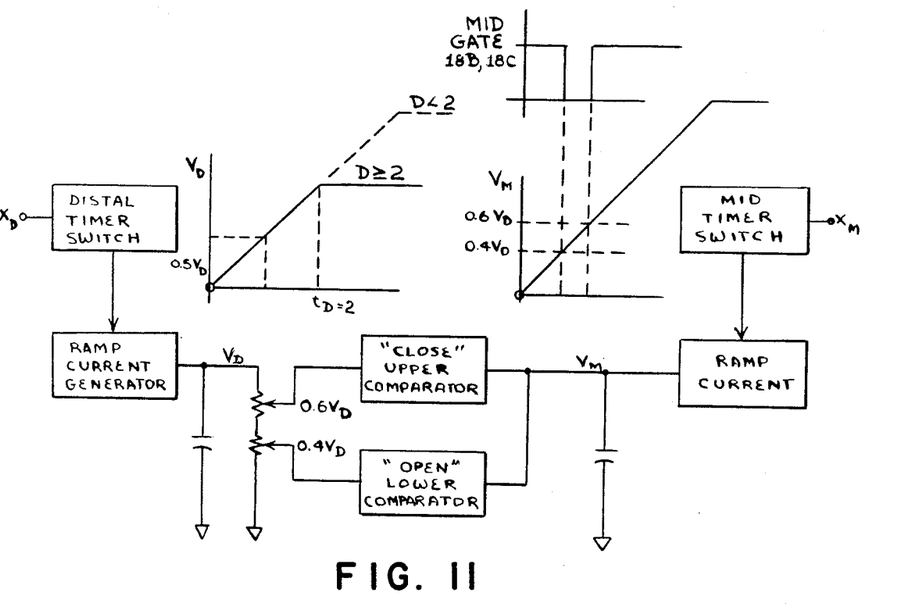
FIG. 11 is a logic circuit diagram of a portion of the block diagram of FIG. 2.

The automatic setting of this proportional mid gate is accomplished by an entirely separate timing circuit. At the same time that the digital clock is running to measure total head size, a distal voltage ramp is generated. This voltage is sampled and held at the same time that the clock is stopped. Thus, it reaches a value, $V_D$, proportional to the head size. The diagram for this circuit is shown in FIG. 11. This voltage appears across a network of resistors with taps at 40 percent and 60 percent of the total resistance. These fractions of $V_D$ are fed into voltage comparators.

As mentioned, the next transmit pulse following a successful distal measurement initiates a mid echo search. In addition to the digital clocking of mid echo arrival times, a mid voltage ramp is initiated. This voltage is applied to the other inputs of the voltage comparators. When the mid ramp exceeds $0.4V_D$, an output is generated to open the mid gate; when it exceeds $0.6V_D$, the mid gate is closed. Thus, the mid-echo recognition pattern (50 in FIG. 2) is designed to pass mid echoes through the signal gate (41 in FIG. 2) to the midline echo memory (52 in FIG. 2) only from the center section of the brain.

Figure 12:
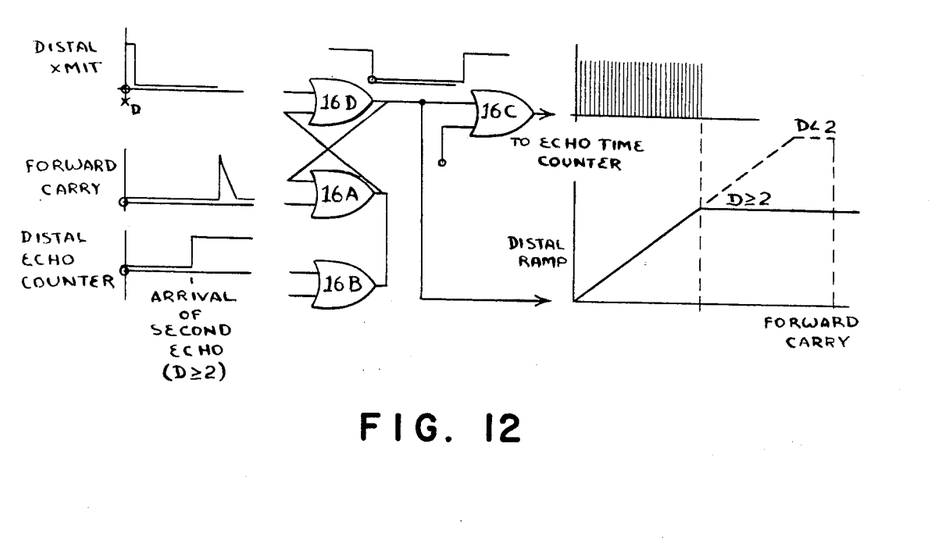
FIG. 12 is another logic circuit diagram of a portion of the block diagram of FIG. 2.

Another illustration of the operational logic is the operation of the distal timer switch (FIG. 12). The purpose of this circuit is to gate on the digital clock and the distal ramp at the start of a distal search and off at the arrival of a second distal echo. As discussed above, this is part of the function of the distal control gate (43 in FIG. 2) and is detailed in the logic diagram, FIG. 8 (16A, 16B, 16C and 16D). Note that these NOR gates are organized as an R/S flip-flop. It is set by the distal transmit pulse, $X_D$, opening NOR gate 16C to initiate the distal timer (44 in FIG. 2) and the distal timing ramp. The timing is turned off upon the arrival of either the second distal echo or the forward carry pulse indicating that the digital timing memory (shift register 65 in FIG. 2) has overflowed.

In operation, the operator simply positions the transducer probe 20 against the patient's head (FIG. 1) and presses start button 30. A completed test will be signalled by the 500 Hz audio tone and the illumination of a number on display 24, which latter is recorded by the operator on bar graph 16 as an X in the appropriate column (FIG. 1). The start button 30 is then pressed for the next and succeeding tests, until enough mid echoes are received to provide a basis for diagnosis. An excess of mid echoes is indicated by panel light 26, at which time the operator may reduce power by overload switch 28. It is a particular feature of the apparatus of the invention that the operator's attention need only be directed to proper positioning of the transducer probe for a measurement, all other functions being achieved automatically and indicated to the operator by audio means.

Another important feature of the invention is the incorporation of a rigid set of test criteria, in the form of specific echo patterns, so that customary variations in operator manipulation and interpretation are not present in the use of the apparatus of the invention.

Figure 5:
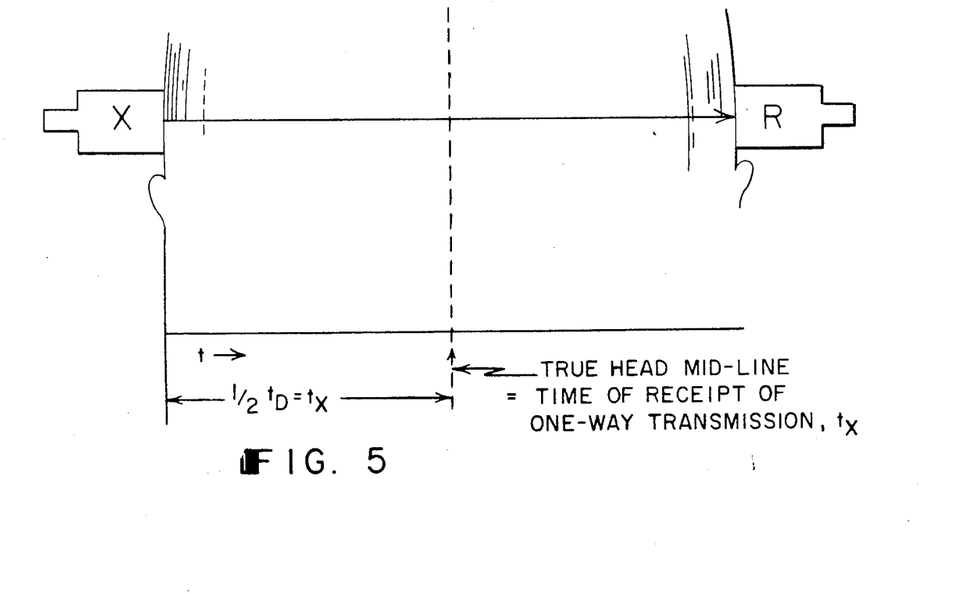
FIG. 5 is a diagrammatic view showing the application of dual probes applied to the head of a patient.

Alternatives to the apparatus described above will be apparent to those skilled in the art. Among such variations are the direct measurement of the head size by using a second transducer 21, as shown in FIG. 5, placed on the opposite side of the head, to receive the distal transmit pulse of ultrasound after a one-way straight-through transmission. This provides the reference value D/2 of FIG. 5 essentially without error, eliminating the need for far side echo pattern recognition circuits. Instrumental changes require only simple modifications of the logic shown in the drawings. In general, too, the computer logic, control and computing operations can be accomplished by many different technical means; analog or digital; mechanical or electrical, familiar to those conversant with the state of the art.

What is claimed is:

1. Apparatus for location of the centerline of the brain relatively to the centerline of a head dimension comprising
    sonic pulse means including transducer means adapted to be applied to a head and sonic pulse generating means connected thereto for providing a sonic pulse for producing echoes from the centerline of the brain
    computing means connected to said sonic pulse means for automatically computing the displacement of the centerline of the brain relatively to the centerline of said head dimension, said computer means comprising
    head dimension measuring means including head dimension centerline calculating means for selecting a successful head measurement and calculating the centerline of said head dimension
    brain centerline measuring means connected to said head dimension measuring means and responsive to a successful head measurement
    displacement calculating means connected to said head dimension and brain centerline measuring means providing a displacement signal of said relative location and
    indicating means responsive to said displacement signal.

2. Apparatus as claimed in claim 1 wherein said computing means includes
    head dimension gate means for masking preliminary echoes.

3. Apparatus as claimed in claim 1, further including
    overload signal means connected to said computer means for signalling the presence of an excess of echoes.

4. Apparatus as claimed in claim 1 wherein
    said brain centerline measuring means includes gate means connected to said head dimension measuring means responsive to echoes within a predetermined displacement of the centerline of said dimension of said head.

5. Apparatus for location of the centerline of the brain relatively to the centerline of a head dimension comprising
    sonic pulse means including transducer means adapted to be applied to a head and sonic pulse generating means connected thereto for providing a sonic pulse for producing echoes from the centerline of the brain
    computing means connected to said sonic pulse means for automatically computing the displacement of the centerline of the brain relatively to the centerline of said head dimension, said computing means comprising
    head dimension measuring means including head dimension centerline calculating means for selecting a successful head measurement and calculating the centerline of said head dimension
    brain centerline measuring means including brain centerline gate means connected to said head dimension centerline calculating means and responsive to echoes with a predetermined displacement of the centerline of said dimension of said head and
    displacement calculating means connected to said head dimension and brain centerline measuring means providing a displacement signal and
    display means for displaying said displacement.

6. Apparatus as claimed in claim 5 wherein said transducer means includes a single transducer adapted to be applied to one side of a head.

7. Apparatus as claimed in claim 5 wherein said transducer means includes dual transducers adapted to be applied each to an opposite side of a head.

8. Apparatus for location of the centerline of the brain relatively to the centerline of a head dimension comprising
    sonic pulse means including transducer means adapted to be applied to one side of a head and sonic pulse generating means connected thereto for providing a sonic pulse for producing echoes from the opposite side of the head and from the centerline of the brain
    computing means connected to said sonic pulse means for automatically computing the displacement of the centerline of the brain relatively to the centerline of said head dimension, said computing means comprising
    head dimension measuring means including head dimension gate means for masking preliminaryy echoes and head dimension centerline calculating means for selecting a successful head measurement and calculating the the centerline of said head dimension brain centerline measuring means connected to said head dimension measuring means and responsive to a successful head measurement, said brain centerline measuring means including brain centerline gate means connected to said head dimension centerline calculating means and responsive to echoes within a predetermined displacement of the centerline of said dimension of said head and displacement calculating means connected to said head dimension and brain centerline measuring means providing a displacement signal and display means for displaying said displacement.

9. Apparatus as claimed in claim 8 wherein said head dimension measuring means includes head measurement signal means for signalling a successful measurement of said head and said brain centerline measuring means includes brain centerline signal means for signalling a successful measurement of said distance to the centerline of the brain.

10. Apparatus as claimed in claim 9 wherein said brain centerline measuring means includes signal means for signalling a brain centerline number of echoes.

* * * * *